US012777529B2

(12) United States Patent
Shanmugaraju et al.

(10) Patent No.: US 12,777,529 B2
(45) Date of Patent: Oct. 27, 2026

(54) RACH OCCASION BLOCKING FOR 5G NR TDD SYSTEMS

(71) Applicant: Outdoor Wireless Networks LLC, Richardson, TX (US)

(72) Inventors: Naveen Shanmugaraju, Bangalore (IN); Esam Obiedat, Plano, TX (US); Ehsan Daeipour, Southborough, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 283 days.

(21) Appl. No.: 18/584,780

(22) Filed: Feb. 22, 2024

(65) Prior Publication Data

US 2024/0324022 A1 Sep. 26, 2024

Related U.S. Application Data

(60) Provisional application No. 63/486,536, filed on Feb. 23, 2023.

(51) Int. Cl.

| | |
|---|---|
| ***H04W 74/00*** | (2009.01) |
| ***H04L 5/14*** | (2006.01) |
| ***H04W 74/08*** | (2009.01) |
| ***H04W 74/0833*** | (2024.01) |

(52) U.S. Cl.

CPC ....... *H04W 74/0833* (2013.01); *H04L 5/1469* (2013.01); *H04W 74/0891* (2013.01)

(58) Field of Classification Search

CPC .......... H04W 74/0833; H04W 74/0891; H04L 5/1469

See application file for complete search history.

(56) References Cited

U.S. PATENT DOCUMENTS

| | | | | |
|---|---|---|---|---|
| 10,742,305 | B2 * | 8/2020 | Schwab | H04B 7/15535 |
| 11,595,998 | B2 * | 2/2023 | Islam | H04W 56/0005 |
| 2019/0159261 | A1 * | 5/2019 | Jung | H04W 74/0833 |
| 2020/0053772 | A1 * | 2/2020 | Pan | H04B 17/327 |
| 2021/0112603 | A1 * | 4/2021 | Xue | H04L 5/0053 |
| 2021/0274555 | A1 * | 9/2021 | Alfarhan | H04W 74/0808 |
| 2022/0007421 | A1 * | 1/2022 | Zewail | H04W 24/08 |
| 2022/0338275 | A1 * | 10/2022 | Xue | H04W 72/0446 |
| 2023/0189343 | A1 * | 6/2023 | Rao | H04L 5/0023 370/329 |
| 2023/0276496 | A1 * | 8/2023 | Agardh | H04L 5/0053 370/330 |

OTHER PUBLICATIONS

ETSI, "TS 138.211 V17.4.0 (Jan. 2023), Technical Specification, 5G; NR; Physical channels and modulation (3GPP TS 38.211 version 17.4.0 Release 17)", Jan. 2023, Page(s) Cover through 140.

* cited by examiner

*Primary Examiner* — Lakeram Jangbahadur
(74) *Attorney, Agent, or Firm* — Fogg & Powers LLC

(57) ABSTRACT

Systems and methods for RACH occasion blocking for 5G NR TDD systems implementations are provided herein. In one example, a method for RACH occasion blocking by a base station includes configuring one or more first Synchronization Signal Blocks SSBs and one or more second SSBs for a cell. The method further includes mapping the one or more first SSBs to one or more first RACH occasions and the one or more second SSBs to one or more second RACH occasions. The method further includes transmitting only the one or more first SSBs and not the one or more second SSBs.

17 Claims, 3 Drawing Sheets

310

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | $x$ | $y$ | | | | | |
| 110 | A3 | 16 | 1 | 9 | 0 | 2 | 2 | 6 |

320

RACH OCCASION BLOCKING FOR 5G NR TDD SYSTEMS

CROSS-REFERENCE TO RELATED APPLICATIONS

This application claims benefit of U.S. Provisional Application Ser. No. 63/486,536 filed on Feb. 23, 2023, and titled "RACH OCCASION BLOCKING FOR 5G NR TDD SYSTEMS," the contents of which are incorporated herein in their entirety.

BACKGROUND

A centralized or cloud radio access network (C-RAN) is one way to implement base station functionality. Typically, for each cell (that is, for each physical cell identifier (PCI)) implemented by a C-RAN, one or more baseband unit (BBU) entities (also referred to herein simply as "BBUs") interact with multiple radio units (also referred to here as "RUs," "remote units," "radio points," or "RPs") in order to provide wireless service to various items of user equipment (UEs). The one or more BBU entities may comprise a single entity (sometimes referred to as a "baseband controller" or simply a "baseband band unit" or "BBU") that performs Layer-3, Layer-2, and some Layer-1 processing for the cell. The one or more BBU entities may also comprise multiple entities, for example, one or more central units (CU) entities that implement Layer-3 and non-time critical Layer-2 functions for the associated base station and one or more distributed units (DUs) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU is configured to implement the radio frequency (RF) interface and the physical layer functions for the associated base station that are not implemented in the DU. The multiple RUs may be located remotely from each other (that is, the multiple RUs are not co-located) or collocated (for example, in instances where each RU processes different carriers or time slices), and the one or more BBU entities are communicatively coupled to the RUs over a fronthaul network.

A distributed antenna system (DAS) can be used to improve the coverage provided by one or more base stations that are coupled to the DAS. A DAS typically includes one or more central units or nodes (also referred to here as "central access nodes (CANs)" or "master units") that are communicatively coupled to a plurality of remotely located access points or antenna units (also referred to here as "remote units"), where each access point can be coupled directly to one or more of the central access nodes or indirectly via one or more other remote units and/or via one or more intermediary or expansion units or nodes (also referred to here as "transport expansion nodes (TENs)"). The base stations can be coupled to the one or more central access nodes via one or more cables or via a wireless connection, for example, using one or more donor ports. The wireless service provided by the base stations can include commercial cellular service and/or private or public safety wireless communications.

In general, each central access node receives one or more downlink signals from one or more base stations and generates one or more downlink transport signals derived from one or more of the received downlink base station signals. Each central access node transmits one or more downlink transport signals to one or more of the access points. Each access point receives the downlink transport signals transmitted to it from one or more central access nodes and uses the received downlink transport signals to generate one or more downlink radio frequency signals that are radiated from one or more coverage antennas associated with that access point. The downlink radio frequency signals are radiated for reception by user equipment (UEs). Typically, the downlink radio frequency signals associated with each base station are simulcasted from multiple remote units. In this way, the DAS increases the coverage area for the downlink capacity provided by the base stations.

Likewise, each access point receives one or more uplink radio frequency signals transmitted from the user equipment. Each access point generates one or more uplink transport signals derived from the one or more uplink radio frequency signals and transmits them to one or more of the central access nodes. Each central access node receives the respective uplink transport signals transmitted to it from one or more access points and uses the received uplink transport signals to generate one or more uplink base station radio frequency signals that are provided to the one or more base stations associated with that central access node. Typically, this involves, among other things, summing uplink signals received from all of the multiple access points in order to produce the base station signal provided to each base station. In this way, the DAS increases the coverage area for the uplink capacity provided by the base stations.

A DAS can use either digital transport, analog transport, or combinations of digital and analog transport for generating and communicating the transport signals between the central access nodes, the access points, and any transport expansion nodes.

SUMMARY

In one aspect, a system comprises a first base station including at least one baseband unit (BBU) entity and a radio unit communicatively coupled to the at least one BBU entity. The first base station is configured to provide service to user equipment in a cell using a Time-Division Duplexing (TDD) configuration. The system further comprises a distributed antenna system including a master unit communicatively coupled to the at least one BBU entity and a plurality of remote antenna units communicatively coupled to the master unit. The plurality of remote antenna units is located remotely from the master unit. The at least one BBU entity is configured to configure one or more first Synchronization Signal Blocks (SSBs) and one or more second SSBs for a cell. The at least one BBU entity is further configured to map the one or more first SSBs to one or more first Random-Access Channel (RACH) occasions and the one or more second SSBs to one or more second RACH occasions. The at least one BBU entity is further configured to transmit only the one or more first SSBs and not the one or more second SSBs.

In another aspect, a base station comprises at least one baseband unit (BBU) entity and a radio unit communicatively coupled to the at least one BBU entity. The radio unit is located remotely from the at least one BBU entity. The base station is configured to provide service to user equipment in a cell using a Time-Division Duplexing (TDD) configuration. The at least one BBU entity is configured to configure one or more first Synchronization Signal Blocks (SSBs) and one or more second SSBs for a cell. The at least one BBU entity is further configured to map the one or more first SSBs to one or more first Random-Access Channel (RACH) occasions and the one or more second SSBs to one or more second RACH occasions. The at least one BBU entity is further configured to transmit only the one or more first SSBs and not the one or more second SSBs.

In another aspect, a method for Random-Access Channel (RACH) occasion blocking by a base station is provided. The base station is configured to provide service to user equipment in a cell using a Time-Division Duplexing (TDD) configuration. The method includes configuring one or more first Synchronization Signal Blocks (SSBs) and one or more second SSBs for a cell. The method further includes mapping the one or more first SSBs to one or more first Random-Access Channel (RACH) occasions and the one or more second SSBs to one or more second RACH occasions. The method further includes transmitting only the one or more first SSBs and not the one or more second SSBs.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
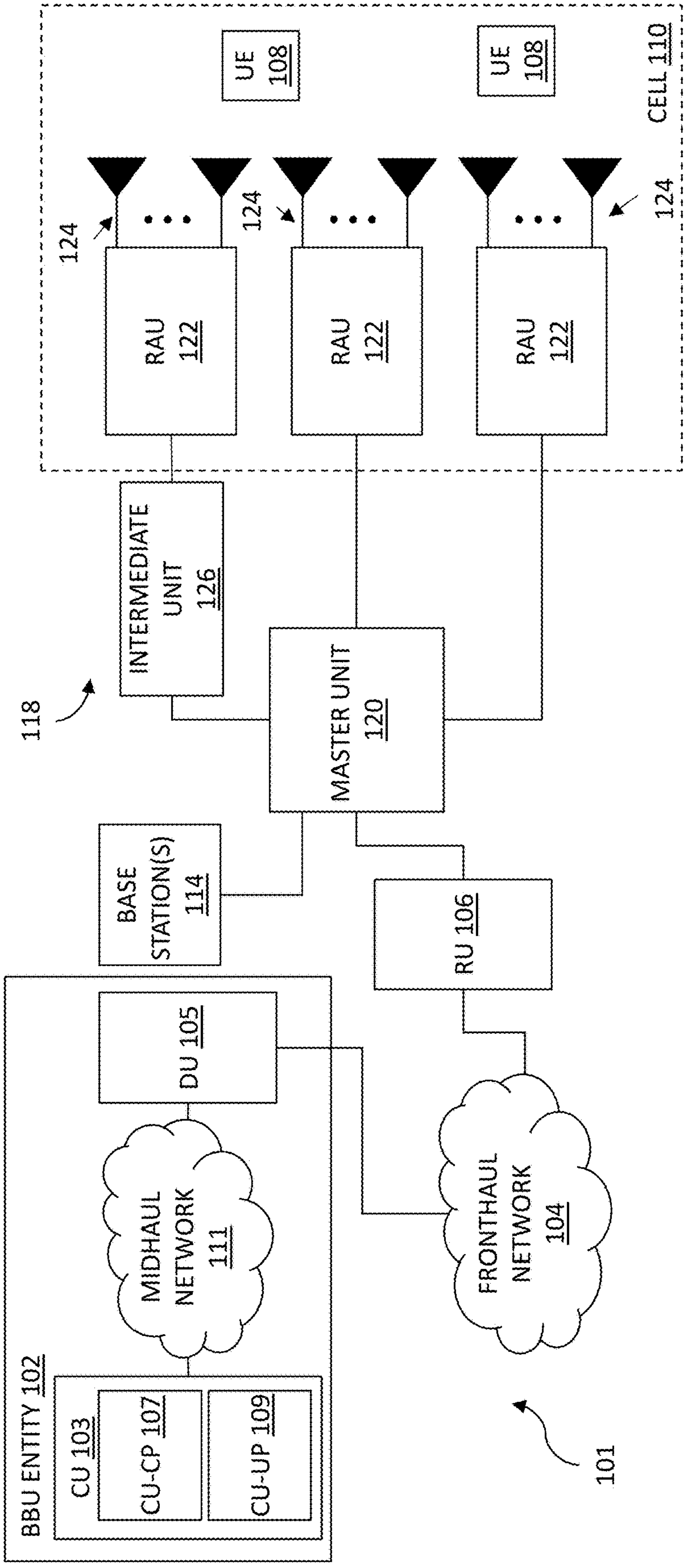
FIG. 1 is a block diagram illustrating an example 5G radio access network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

For fifth generation (5G) New Radio (NR) networks, Time-Division-Duplexing (TDD) channels are used to provide service to UEs in a cell. When utilizing a DAS for transport and distribution of TDD signals, there can be a significant amount of latency (for example, 3 msec round-trip) introduced due to DAS transport delay (for example, due to the length of fiber used in the DAS) and any DAS processing delay (in the case of an active or digital DAS) in addition to the latency expected for propagation of the wireless signals. This additional latency leads to the donor radio receiving a RACH signal from the UE later than the start of the slot boundary, which can result in the Random-Access Channel (RACH) signals transmitted from the UE being missed or misdetected (for example, incorrect cyclic shift detection) by the base station. In order to compensate for this, the base station can delay its RACH detection window, with respect to the uplink and downlink frame timing, by an amount equal to the total DAS delay for the uplink and downlink. For TDD configurations, this approach can lead to a RACH occasion extending into the next time slot. When the next time slot is a downlink slot, the RACH signal transmission can cause interference with UEs attempting to receive signals on the downlink.

While the problems described above involve 5G NR systems, it is to be understood the techniques described here can be used with other wireless interfaces and references to "gNB" can be replaced with the more general term "base station" or "base station entity" and/or a term particular to the alternative wireless interfaces. Furthermore, it is also to be understood that 5G NR embodiments can be used in both standalone and non-standalone modes (or other modes developed in the future), and the following description is not intended to be limited to any particular mode. Also, unless explicitly indicated to the contrary, references to "layers" or a "layer" (for example, Layer-1, Layer-2, Layer-3, the Physical Layer, the MAC Layer, etc.) set forth herein refer to layers of the wireless interface (for example, 5G NR) used for wireless communication between a base station and user equipment.

FIG. 1 is a block diagram illustrating an example system 100 in which the techniques for RACH occasion blocking described herein can be implemented. In the example shown in FIG. 1, the system 100 includes a base station 101 comprising one or more baseband unit (BBU) entities 102 communicatively coupled to a RU 106 via a fronthaul network 104. The base station 101 provides wireless service to various items of user equipment (UEs) 108 in a cell 110. Each BBU entity 102 can also be referred to simply as a "BBU."

In the example shown in FIG. 1, the one or more BBU entities 102 comprise one or more central units (CUs) 103 and one or more distributed units (DUs) 105. Each CU 103 implements Layer-3 and non-time critical Layer-2 functions for the associated base station 101. Each DU 105 is configured to implement the time critical Layer-2 functions and at least some of the Layer-1 (also referred to as the Physical Layer) functions for the associated base station 101. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RU 106 is configured to implement the control-plane and user-plane Layer-1 functions not implemented by the DU 105 as well as the radio frequency (RF) functions. The RU 106 is typically located remotely from the one or more BBU entities 102. In the example shown in FIG. 1, the RU 106 is implemented as a physical network function (PNF) and is deployed in or near a physical location where radio coverage is to be provided in the cell 110. In the example shown in FIG. 1, the RU 106 is communicatively coupled to the DU 105 using a fronthaul network 104. In some examples, the fronthaul network 104 is a switched Ethernet fronthaul network (for example, a switched Ethernet network that supports the Internet Protocol (IP)).

While the example shown in FIG. 1 includes a single CU-CP 107, a single CU-UP 109, a single DU 105, and a single RU 106 for the base station 101, it should be understood that this is an example and other numbers of BBU entities 102, components of the BBU entities 102, and/or other numbers of RUs 106 can also be used.

The base station 101 that include the components shown in FIG. 1 can be implemented using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in other ways. In some examples, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the one or more BBU entities 102 (for example, the CU 103, CU-CP 107, CU-UP 109, and/or DU 105) are implemented as a software virtualized entities that are executed in a scalable cloud environment on a cloud worker node under the control of the cloud native software executing on that cloud worker node. In some such examples, the DU 105 is communicatively coupled to at least one CU-CP 107 and at least one CU-UP 109, which can also be implemented as software virtualized entities. In some other examples, one or more components of the one or more BBU entities 102 (for example, the CU-CP 107, CU-UP 109, and/or DU 105) are implemented as a single virtualized entity executing on a single cloud worker node. In some examples, the at least one CU-CP 107 and the at least one CU-UP 109 can each be implemented as a single virtualized entity executing on the same cloud worker node or as a single virtualized entity executing on a different cloud worker node. However, it is to be understood that different configurations and examples can be implemented in other ways. For example, the CU 103 can be implemented using multiple CU-UP VNFs and using multiple virtualized entities executing on one or more cloud worker nodes. Moreover, it is to be understood that the CU 103 and DU 105 can be implemented in the same cloud (for example, together in a radio cloud or in an edge cloud). In some examples, the DU 105 is configured to be coupled to the CU-CP 107 and CU-UP 109 over a midhaul network 111 (for example, a network that supports the Internet Protocol (IP)). Other configurations and examples can be implemented in other ways.

Typically, the RU 106 would include or be coupled to a set of antennas via which downlink RF signals are radiated to UEs 108 and via which uplink RF signals transmitted by UEs 108 are received. The UEs 108 can be mobile but this is not required (for example, where the UE 108 is integrated into, or is coupled to, a sensor unit that is deployed in a fixed location and that periodically wirelessly communicates with a gateway or other device). However, in the example shown in FIG. 1, the RU 106 of the base station 101 is communicatively coupled to a DAS 118. The DAS 118 includes one or more master units 120 (also referred to as "host units" or "central area nodes" or "central units") and one or more remote antenna units 122 (also referred to as "remote units" or "radiating points") that are communicatively coupled to the one or more master units 120. In this example, the DAS 118 comprises a digital DAS, in which DAS traffic is distributed between the master unit 120 and the remote antenna units 122 in digital form. The DAS 118 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the example of FIG. 1, the master unit 120 is communicatively coupled to one or more antenna ports of the RU 106 of the base station 101. In some examples, one or more components of the base station 101 (for example, the RU 106) can be co-located with the master unit 120 to which it is coupled (for example, where the base station 101 is dedicated to providing base station capacity to the DAS 118). In other examples, the base station 101 can be located remotely from the respective master unit 120 to which it is coupled (for example, where the base station 101 is a macro base station providing base station capacity to a macro cell in addition to providing capacity to the DAS 118). In this latter case, a master unit 120 can be coupled to a donor antenna using an over-the-air repeater in order to wirelessly communicate with the remotely located base station 101.

The master unit 120 can be configured to use wideband interfaces or narrowband interfaces to the base station 101. In the example shown in FIG. 1, the master unit 120 is configured to interface with the base station 101 using an analog radio frequency (RF) interface. In the example shown in FIG. 1, the master unit 120 interfaces with the base station 101 using the analog radio frequency signals that the base station 101 would communicate to and from a UE 108 using a suitable air interface standard. The DAS 118 operates as a distributed repeater for such radio frequency signals. RF signals transmitted from the base station 101 (also referred to herein as "downlink RF signals") are received at the master unit 120. In such examples, the master unit 120 uses the downlink RF signals to generate a downlink transport signal that is distributed to one or more of the remote antenna units 122. Each such remote antenna unit 122 receives the downlink transport signal and reconstructs a version of the downlink RF signals based on the downlink transport signal and causes the reconstructed downlink RF signals to be radiated from a single antenna or set of antennas 124 coupled to or included in that remote antenna unit 122. In some examples, the set of antennas 124 includes two or four antennas. However, it should be understood that the set of antennas 124 can include two or more antennas 124.

In some aspects, the master unit 120 is directly coupled to the remote antenna units 122. In such aspects, the master unit 120 is coupled to the remote antenna units 122 using cables. For example, the cables can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from UEs 108 (also referred to herein as "uplink RF signals") are received at one or more remote antenna units 122 via the antenna(s) 124. Each remote antenna unit 122 uses the uplink RF signals to generate an uplink transport signal that is transmitted from the remote antenna unit 122 to a master unit 120. The master unit 120 receives uplink transport signals transmitted from one or more remote antenna units 122 coupled to it. The master unit 120 can combine data or signals communicated via the uplink transport signals from multiple remote antenna units 122 (for example, where the DAS 118 is implemented as a digital DAS 118, by digitally summing corresponding digital samples received from the various remote antenna units 122) and generates uplink RF signals from the combined data or signals. In such examples, the master unit 120 communicates the generated uplink RF signals to the base station 101. In this way, the coverage of the base station 101 can be expanded using the DAS 118.

In the example shown in FIG. 1, the DAS 118 is implemented as a digital DAS. In some examples of a "digital" DAS, real digital signals are communicated between the master unit 120 and the remote antenna units 122. In some examples of a "digital" DAS, signals received from and provided to the base station 101 and UEs 108 are used to produce digital in-phase (I) and quadrature (Q) samples, which are communicated between the master unit 120 and remote antenna units 122. It is important to note that this digital IQ representation of the original signals received from the base station 101 and from the mobile units still maintains the original modulation (that is, the change in the instantaneous amplitude, phase, or frequency of a carrier) used to convey telephony or data information pursuant to the cellular air interface standard used for wirelessly communicating between the base station 101 and the UEs 108. Examples of such cellular air interface standards include, for example, the Global System for Mobile Communication (GSM), Universal Mobile Telecommunications System (UMTS), High-Speed Downlink Packet Access (HSDPA), Long-Term Evolution (LTE), Citizens Broadband Radio Service (CBRS), and fifth generation New Radio (5G NR) air interface standards. Also, each stream of digital IQ samples represents or includes a portion of the frequency spectrum. For example, the digital IQ samples can represent a single radio access network carrier (for example, a 5G NR carrier with 50 MHz or 500 MHz signal bandwidth) onto which voice or data information has been modulated using a 5G NR air interface. However, it is to be understood that each such stream can also represent multiple carriers (for example, in a band of the frequency spectrum or a sub-band of a given band of the frequency spectrum).

As discussed above, in the example shown in FIG. 1, the master unit 120 can be configured to interface with the base station 101 using an analog RF interface (for example, via the analog RF interface of an RRH or a small cell base station). In some examples, the base station 101 can be coupled to the master unit 120 using a network of attenuators, combiners, splitters, amplifiers, filters, cross-connects, etc., which is referred to collectively as a point-of-interface (POI) (not shown). This is done so that, in the downlink, the desired set of RF carriers output by the base station 101 can be extracted, combined, and routed to the appropriate master unit 120, and so that, in the uplink, the desired set of carriers output by the master unit 120 can be extracted, combined, and routed to the appropriate interface. In other examples, the POI can be part of the master unit 120.

In the example shown in FIG. 1, in the downlink, the master unit 120 can produce digital IQ samples from an analog signal received at certain radio frequencies. These digital IQ samples can also be filtered, amplified, attenuated, and/or re-sampled or decimated to a lower sample rate. The digital samples can be produced in other ways. Each stream of digital IQ samples represents a portion of the frequency spectrum output by the base station 101.

Likewise, in the uplink, the master unit 120 can produce an uplink analog signal from one or more streams of digital IQ samples received from one or more remote antenna units 122 by digitally combining streams of digital IQ samples that represent the same carriers or frequency bands or sub-bands received from multiple remote antenna units 122 (for example, by digitally summing corresponding digital IQ samples from the various remote antenna units 122), performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined.

In some examples, the master unit 120 can also be configured to interface with one or more additional base stations 114 using an analog RF interface or a digital interface (in addition to, or instead of) interfacing with the base station 101 via an analog RF interface. For example, the master unit 120 can be configured to interact directly with one or more BBUs 102 of the one or more base stations 114 using the digital IQ interface that is used for communicating between the BBUs 102 and an RRHs (for example, using the CPRI serial digital IQ interface).

In some examples, the one or more base stations 114 can be implemented in a traditional manner in which a baseband unit (BBU) is deployed at the same location with a remote radio head (RRH) to which it is coupled, where the BBU and RRH are coupled to each other using optical fibers over which front haul data is communicated as streams of digital IQ samples (for example, in a format that complies with one of the Common Public Radio Interface (CPRI), Open Base Station Architecture Initiative (OBSAI), and Open RAN (O-RAN) families of specifications). Also, the one or more base stations 114 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the one or more base stations 114 can be implemented as a small cell base station in which the BBU and RRH functions are deployed together in a single package.

In some examples, the master unit 120 interfaces with the one or more base stations 114 via one or more wireless interface nodes (not shown). A wireless interface node can be located, for example, at a base station hotel, and group a particular part of a RF installation to transfer to the master unit 120.

When interfacing with one or more base stations 114 using the digital interface, in the downlink, the master unit 120 terminates one or more downlink streams of digital IQ samples provided to it from one or more BBUs 102 and, if necessary, converts (by re-sampling, synchronizing, combining, separating, gain adjusting, etc.) them into downlink streams of digital IQ samples compatible with the remote antenna units 122 used in the DAS 118. In the uplink, the master unit 120 receives uplink streams of digital IQ samples from one or more remote antenna units 122, digitally combining streams of digital IQ samples that represent the same carriers or frequency bands or sub-bands received from multiple remote antenna units 122 (for example, by digitally summing corresponding digital IQ samples received from the various remote antenna units 122), and, if necessary, converts (by re-sampling, synchronizing, combining, separating, gain adjusting, etc.) them into uplink streams of digital IQ samples compatible with the one or more BBUs 102 that are coupled to that master unit 120.

In the downlink, each remote antenna unit 122 receives streams of digital IQ samples from the master unit 120, where each stream of digital IQ samples represents a portion of the radio frequency spectrum output by one or more base stations 114. Each remote antenna unit 122 generates, from the downlink digital IQ samples, one or more downlink RF signals for radiation from the one or more antennas coupled to that remote antenna unit 122 for reception by any user equipment 108 in the associated coverage area. In the uplink, each remote antenna unit 122 receives one or more uplink radio frequency signals transmitted from any user equipment 108 in the associated coverage area, generates one or more uplink streams of digital IQ samples derived from the received one or more uplink radio frequency signals, and transmits them to the master unit 120.

Each remote antenna unit 122 can be communicatively coupled directly to one or more master units 120 or indirectly via one or more other remote antenna units 122 and/or via one or more intermediate units 126 (also referred to as "expansion units" or "transport expansion nodes"). The latter approach can be done, for example, in order to increase the number of remote antenna units 122 that a single master unit 120 can feed, to increase the master-unit-to-remote-antenna-unit distance, and/or to reduce the amount of cabling needed to couple a master unit 120 to its associated remote antenna units 122. The expansion units are coupled to the master unit 120 via one or more cables 521.

In some examples, a remote antenna unit 122 can be co-located with another remote antenna unit 122 (also referred to herein as an "extension unit") communicatively coupled to it. Subtending a co-located extension remote antenna unit 122 from another remote antenna unit 122 can be done in order to expand the number of frequency bands that are radiated from that same location and/or to support MIMO service (for example, where different co-located remote antenna units radiate and receive different MIMO streams for a single MIMO frequency band). The remote antenna unit 122 is communicatively coupled to the "extension" remote antenna units 122 using a fiber optic cable, a multi-conductor cable, coaxial cable, or the like. In such an implementation, the remote antenna units 122 are coupled to the master unit 120 of the DAS 118 via another remote antenna unit 122.

In the example shown in FIG. 1, the base station 101 is configured to transmit and receive signals to/from UEs 108 in the cell 110 using a TDD configuration. In some examples, the base station 101 is configured to use a TDD configuration defined in a 3rd Generation Partnership Project (3GPP) specification.

In order to enable UEs 108 to connect to the base station 101, the base station 101 is configured to transmit one or more Synchronization Signal Blocks (SSBs) via the remote antenna units 122 to UEs 108 in the cell 110. Due to the additional delay of the DAS 118, the frame timing observed by the UEs 108 will be offset from the frame timing used by the base station 101 by an amount equal to the downlink delay introduced by the DAS 118.

When a UE 108 first attempts to connect to the base station 101, the UE 108 is configured to receive the one or more SSBs transmitted by the base station 101 via the remote antenna units 122, and the UE 108 is configured to transmit RACH signals (for example, a PRACH preamble) using designated symbols of an uplink time slot for a particular RACH occasion. Since the DAS 118 is transparent to the UE 108 such that the UE 108 is unaware of the DAS 118, the RACH signals transmitted by the UE 108 will arrive at the RU 106 of the base station 101 with a delay equal to the downlink delay of the DAS 118 plus the uplink delay of the DAS 118. In the specific case where the downlink delay of the DAS 118 is equal to the uplink delay of the DAS 118, the total delay of the RACH signals introduced by the DAS 118 is equal to the DAS round-trip time (DAS RTT). Where the downlink delay of the DAS 118 is not equal to the uplink delay of the DAS 118, the total delay of the RACH signals introduced by the DAS 118 is more generally equal to the downlink delay of the DAS 118 plus the uplink delay of the DAS 118.

In order to avoid missing or misdetecting RACH signals from the UEs 108, the base station 101 can be configured to delay a RACH detection window at the RU 106, with respect to the uplink and downlink frame timing, by an amount equal to the total delay of the DAS 118 (for example, DAS RTT). In some examples, the total delay of the DAS 118 is determined during or prior to commissioning the system 100. In some examples, the total delay of the DAS 118 is determined based on the transport delay and any processing delay for the DAS 118 in both the uplink and downlink.

For TDD configurations, a downlink slot will follow an uplink slot in a frame. If one or more RACH occasions are scheduled in an uplink slot that directly precedes a downlink slot, then the RACH signals transmitted by UEs 108 in designated symbols for the one or more RACH occasions could lead to interference when the total delay introduced by the DAS 118 is large enough such that symbols of a RACH occasion extend into the downlink slot.

In some examples, the base station 101 can avoid UEs 108 causing interference when transmitting RACH signals by utilizing a RACH configuration that does not include any RACH occasions that can extend into a downlink slot even when using the DAS 118. For example, the base station 101 can be configured to utilize only RACH configurations that do not include any RACH occasions that are scheduled in symbols of an uplink slot that would extend into a downlink slot when factoring in the total delay of the DAS 118.

However, for TDD configurations defined in 3GPP specifications (for example 3GPP Technical Specification (TS) 38.211), it may be the case that all RACH configurations will have one or more RACH occasions in an uplink slot that immediately precedes a downlink slot, and at least one of those RACH occasions can extend into the downlink slot when using the DAS 118. For such TDD configurations, the base station 101 is configured to utilize the RACH occasion blocking techniques discussed herein to avoid UEs 108 causing interference when transmitting RACH signals.

The base station 101 is configured to use one or more "dummy" SSBs to block RACH occasions that would otherwise extend into a downlink slot. In this context, the BBU entity 102 (for example, the DU 105) is configured to schedule one or more "dummy" SSBs to block RACH occasions in addition to one or more "regular" SSBs that will be utilized by UEs 108 to connect to the base station 101. The BBU entity 102 is configured to map the one or more "dummy" SSBs to the RACH occasions that would extend into a downlink slot and map the one or more "regular" SSBs to the RACH occasions that would not extend into the downlink slot. The base station 101 is configured to transmit only the one or more "regular" SSBs via the remote antenna units 122 and not the one or more "dummy" SSBs. Since the one or more "dummy" SSBs are not transmitted, no UE 108 will utilize the RACH occasions, mapped to those one or more "dummy" SSBs, that would extend into a downlink slot.

Figure 2:
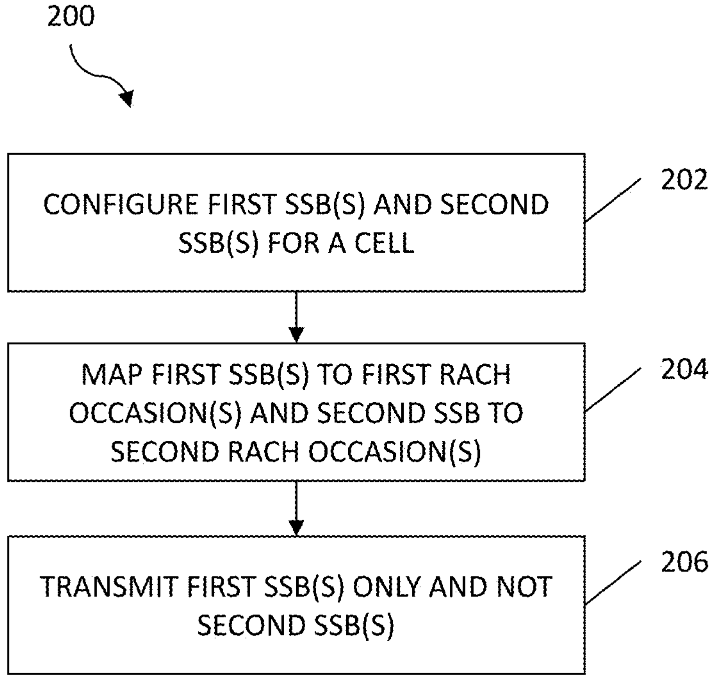
FIG. 2 illustrates a flow diagram of an example method of RACH occasion blocking.

FIG. 2 illustrates a flow diagram of an example method 200 of RACH occasion blocking. The common features discussed above with respect to FIG. 1 can include similar characteristics to those discussed with respect to method 200 and vice versa. In some examples, the method 200 is performed by a BBU entity of the base station (for example, the DU 105 of base station 101).

The method 200 includes configuring one or more first SSBs and one or more second SSBs for a cell (block 202). In some examples, the one or more first SSBs are the "regular" SSBs that will be used by UEs to connect to the base station, and the one or more second SSBs are the "dummy" SSBs that will be used to block RACH occasions that would extend into a downlink slot. In some examples, configuring the one or more first SSBs and one or more second SSBs for the cell includes setting a particular value for a parameter that defines the number of SSBs (for example, ssb-PositionsInBurst). The particular number of first SSBs and second SSBs is flexible and dependent on the RACH configuration, but at least one first SSB and at least one second SSB must be configured to utilize the RACH occasion blocking.

In some examples, configuring the one or more first SSBs and the one or more second SSBs is based on a determination of which RACH occasions to block. The determination is based on the RACH configuration for the base station and the total delay of the DAS. The RACH configuration, which is dependent on the TDD configuration (defining the sequence of downlink slots, uplink slots, and special slots), indicates subframe number(s) for RACH, a starting symbol for RACH, a number of RACH slots in a subframe, a number of RACH occasions in the RACH slot, and the RACH occasion duration (for example, the number of symbols for the RACH occasion). In some examples, the RACH configuration for the base station corresponds to a configuration defined in 3GPP TS 38.211 (for example, in Table 6.3.3.2-3). The total delay of the DAS corresponds to the downlink delay plus the uplink delay for the DAS. In some examples, the total delay of the DAS is determined during or prior to commissioning of the system.

The total delay of the DAS can be expressed as a duration of time, which corresponds to a particular number of symbols in a slot. In some examples, the determination of which RACH occasions to block includes determining which RACH occasions would extend into the uplink slot if delayed by the particular number of symbols corresponding to the duration of time of the latency introduced by the DAS. For example, if the total delay of the DAS corresponds to N symbols, then any RACH occasion within the last N symbols of the uplink slot immediately preceding a downlink slot would need to be blocked.

The method 200 further includes mapping the one or more first SSBs to one or more first RACH occasions and mapping the one or more second SSBs to one or more second RACH occasions (block 204). The one or more first RACH occasions are RACH occasions that will not extend into the downlink slot and thus do not need to be blocked. The one or more second RACH occasions are RACH occasions that will extend into the downlink slot and need to be blocked. In some examples, mapping the one or more first SSBs to one or more first RACH occasions and mapping the one or more second SSBs to one or more second RACH occasions includes setting a particular value for a mapping parameter (for example, ssb-perRACH-OccasionAndCB-PreamblesPerSSB). In some examples, the parameter is set to "one" such that each SSB is mapped to a respective RACH occasion. In other examples, the mapping parameter is set to a different value. The mapping parameter is set such that only the one or more first SSBs are mapped to the one or more first RACH occasions and the one or more second SSBs are mapped to the one or more second RACH occasions.

The method 200 further includes transmitting only the one or more first SSBs and not the one or more second SSBs (block 206). In some examples, the one or more first SSBs are transmitted via the remote antenna units of the DAS. The UEs in the cell are made aware that the one or more first SSBs and the one or more second SSBs are configured for the cell. However, the UEs in the cell will only see (and detect) the one or more first SSBs and not the one or more second SSBs because only the first SSBs are transmitted. Therefore, only the one or more first RACH occasions will be used by the UEs in the cell when connecting to the base station because the one or more second SSBs will never be selected by the UEs in the cell.

Figure 3:
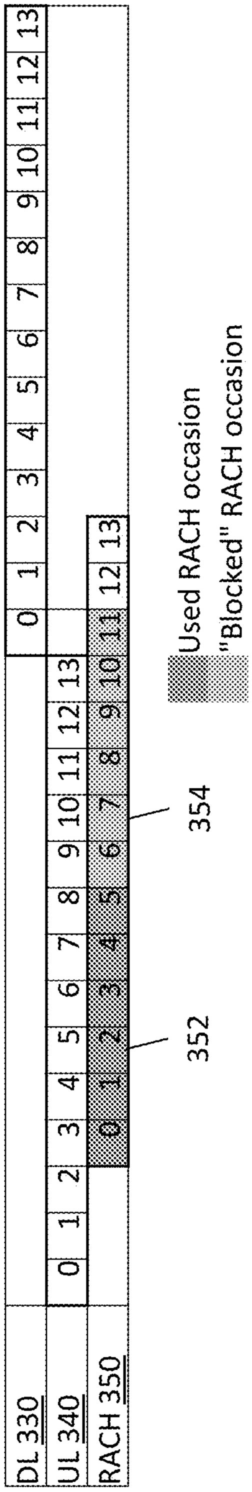
FIG. 3 illustrates an example RACH configuration and subframe showing RACH occasion blocking.

FIG. 3 illustrates a particular example RACH configuration 310 and subframe 320 showing RACH occasion blocking. In the example shown in FIG. 3, the RACH configuration 310 corresponds to a DDDSU TDD configuration and the PRACH configuration index 110 for Frequency Range 1 (FR1) TDD from Table 6.3.3.2-3. For this example, it is assumed that only one SSB is actually used by the base station 101, and the total delay of the DAS is approximately three symbols.

The subframe 320 shows the symbols allocated for the downlink slot 330 and the uplink slot 340 according to the TDD configuration and the RACH configuration 310. The subframe 320 also shows the symbols allocated for the RACH slot 350. In the example shown in FIG. 3, there are two RACH occasions 352, 354 in the RACH slot 350. The first RACH occasion 352 utilizes the first six symbols of the RACH slot (symbols 0-5), and the second RACH occasion 354 utilizes the next six symbols of the RACH slot (symbols 6-11). As shown in the subframe 320, due to the three-symbol delay of the DAS 118, the second RACH occasion 354 extends into the downlink slot 330 and needs to be blocked to avoid interference that would be caused by UEs 108 using the second RACH occasion 354.

In the example shown in FIG. 3, the BBU entity 102 (for example, the DU 105) of the base station 101 is configured to set the ssb-PositionsInBurst parameter to "11000000" and set the ssb-perRACH-OccasionAndCB-PreamblesPerSSB parameter to "one." This configures two SSBs for the system 100, and each of the SSBs is mapped to a respective RACH occasion in the RACH slot 350. For the purposes of this example, the first SSB can be designated as the "regular" SSB that will actually be used by the base station 101, and the second SSB can be designated as the "dummy" SSB that will be used to block the second RACH occasion. The base station 101 is configured to only transmit the first SSB via the remote antenna units 122 and not the second SSB. The UEs 108 in the cell 110 will only see (and detect) the first SSB and not the second SSB because only the first SSB is transmitted. Therefore, only the first RACH occasion 352 will be used by the UEs 108 in the cell 110 when connecting to the base station 101. In this way, the base station 101 blocks the UEs 108 from using the second RACH occasion 354 and causing interference for other UEs 108 attempting to received downlink signals.

It should be understood that the number of "regular" SSBs and the number of "dummy" SSBs can be configured in any manner consistent with the TDD configuration and the RACH configuration used by the base station 101. More than one "regular" SSB and more than one "dummy" SSB can be configured depending on the number of RACH occasions, the duration of the RACH occasions, the delay of the DAS 118, etc. Therefore, the techniques described herein are not limited to any particular TDD configuration, RACH configuration, or combination of SSBs.

Further, while the techniques described herein are specifically discussed in the context of using a DAS, it should be understood that similar techniques could be used to reduce interference caused by RACH transmissions in other systems. For example, similar techniques could be used for systems where there is a large, predictable delay that causes a UE RACH transmission to extend into a downlink slot of a TDD configuration.

Other examples are implemented in other ways.

The example techniques described herein for RACH occasion blocking avoid interference caused by UE RACH transmissions when communicating with a base station via a DAS. Depending on the particular configuration, the RACH occasion blocking techniques can avoid this interference altogether without impacting throughput. The RACH occasion block techniques will impact the physical resource blocks (PRBs) available for RACH, but other non-RACH PRBs for the Physical Uplink Shared Channel (PUSCH) may not be blocked or impacted by these techniques.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: a first base station including at least one baseband unit (BBU) entity and a radio unit communicatively coupled to the at least one BBU entity, wherein the first base station is configured to provide service to user equipment in a cell using a Time-Division Duplexing (TDD) configuration; and a distributed antenna system including a master unit communicatively coupled to the at least one BBU entity and a plurality of remote antenna units communicatively coupled to the master unit, wherein the plurality of remote antenna units is located remotely from the master unit; wherein the at least one BBU entity is configured to: configure one or more first Synchronization Signal Blocks (SSBs) and one or more second SSBs for a cell; map the one or more first SSBs to one or more first Random-Access Channel (RACH) occasions and the one or more second SSBs to one or more second RACH occasions; and transmit only the one or more first SSBs and not the one or more second SSBs.

Example 2 includes the system of Example 1, wherein the one or more first RACH occasions are scheduled before the one or more second RACH occasions in a single uplink slot in the TDD configuration, wherein the single uplink slot immediately precedes a downlink slot in the TDD configuration.

Example 3 includes the system of any of Examples 1-2, wherein a downlink delay and an uplink delay through the distributed antenna system has a duration of approximately N symbols, wherein at least one of the one or more second RACH occasions is scheduled in the last N symbols of an uplink slot in the TDD configuration, wherein the uplink slot immediately precedes a downlink slot in the TDD configuration.

Example 4 includes the system of any of Examples 1-3, wherein the at least one BBU entity is configured to configure only one first SSB and only one second SSB.

Example 5 includes the system of any of Examples 1-3, wherein the one or more first SSBs include at least two first SSBs; and/or wherein the one or more second SSBs include at least two second SSBs.

Example 6 includes the system of any of Examples 1-5, wherein the at least one BBU entity is configured to configure the one or more first SSBs and one or more second SSBs for the cell based on the RACH configuration, a downlink delay of the distributed antenna system, and an uplink delay of the distributed antenna system.

Example 7 includes the system of any of Examples 1-6, wherein the at least one BBU entity includes one or more central units communicatively coupled to one or more distributed units, wherein the one or more distributed units are communicatively coupled to the radio unit.

Example 8 includes the system of any of Examples 1-7, wherein the master unit is communicatively coupled to at least one second base station different than the first base station.

Example 9 includes the system of any of Examples 1-8, wherein the master unit is communicatively coupled to an antenna port of the radio unit.

Example 10 includes a base station, comprising: at least one baseband unit (BBU) entity; and a radio unit communicatively coupled to the at least one BBU entity, wherein the radio unit is located remotely from the at least one BBU entity, wherein the base station is configured to provide service to user equipment in a cell using a Time-Division Duplexing (TDD) configuration; wherein the at least one BBU entity is configured to: configure one or more first Synchronization Signal Blocks (SSBs) and one or more second SSBs for a cell; map the one or more first SSBs to one or more first Random-Access Channel (RACH) occasions and the one or more second SSBs to one or more second RACH occasions; and transmit only the one or more first SSBs and not the one or more second SSBs.

Example 11 includes the base station of Example 10, wherein the one or more first RACH occasions are scheduled before the one or more second RACH occasions in a single uplink slot in the TDD configuration, wherein the single uplink slot immediately precedes a downlink slot in the TDD configuration.

Example 12 includes the base station of any of Examples 10-11, wherein a downlink delay and an uplink delay of distributed antenna system communicatively coupled to the base station has a duration of approximately N symbols, wherein at least one of the one or more second RACH occasions is scheduled in the last N symbols of an uplink slot in the TDD configuration, wherein the uplink slot immediately precedes a downlink slot in the TDD configuration.

Example 13 includes the base station of any of Examples 10-12, wherein the at least one BBU entity is configured to configure only one first SSB and only one second SSB.

Example 14 includes the base station of any of Examples 10-12, wherein the one or more first SSBs include at least two first SSBs; and/or wherein the one or more second SSBs include at least two second SSBs.

Example 15 includes the base station of any of Examples 10-14, wherein the at least one BBU entity is configured to configure the one or more first SSBs and one or more second SSBs for the cell based on the RACH configuration, a downlink delay of a distributed antenna system, and an uplink delay of the distributed antenna system, wherein the distributed antenna system is communicatively coupled to the base station.

Example 16 includes the base station of any of Examples 10-15, wherein the at least one BBU entity includes one or more central units communicatively coupled to one or more distributed units, wherein the one or more distributed units are communicatively coupled to the radio unit.

Example 17 includes a method for Random-Access Channel (RACH) occasion blocking by a base station, wherein the base station is configured to provide service to user equipment in a cell using a Time-Division Duplexing (TDD) configuration, the method comprising: configuring one or more first Synchronization Signal Blocks (SSBs) and one or more second SSBs for a cell; mapping the one or more first SSBs to one or more first Random-Access Channel (RACH) occasions and the one or more second SSBs to one or more second RACH occasions; transmitting only the one or more first SSBs and not the one or more second SSBs.

Example 18 includes the method of Example 17, wherein the one or more first RACH occasions are scheduled before the one or more second RACH occasions in a single uplink slot in the TDD configuration, wherein the single uplink slot immediately precedes a downlink slot in the TDD configuration.

Example 19 includes the method of any of Examples 17-18, wherein configuring the one or more first SSBs and one or more second SSBs for the cell is based on a RACH configuration, a downlink delay of a distributed antenna system, and an uplink delay of the distributed antenna system, wherein the distributed antenna system is communicatively coupled to the base station.

Example 20 includes the method of Example 19, wherein the downlink delay of the distributed antenna system plus the uplink delay of the distributed antenna system has a duration of approximately N symbols, wherein at least one of the one or more second RACH occasions is scheduled in the last N symbols of an uplink slot in the TDD configuration, wherein the uplink slot immediately precedes a downlink slot in the TDD configuration.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:

a first base station including at least one baseband unit (BBU) entity and a radio unit communicatively coupled to the at least one BBU entity, wherein the first base station is configured to provide service to user equipment in a cell using a Time-Division Duplexing (TDD) configuration; and a distributed antenna system including a master unit communicatively coupled to the at least one BBU entity and a plurality of remote antenna units communicatively coupled to the master unit, wherein the plurality of remote antenna units is located remotely from the master unit;

wherein the at least one BBU entity is configured to:

configure one or more first Synchronization Signal Blocks (SSBs) and one or more second SSBs for a cell;

map the one or more first SSBs to one or more first Random-Access Channel (RACH) occasions and the one or more second SSBs to one or more second RACH occasions; and transmit only the one or more first SSBs of the one or more first RACH occasions and not the one or more second SSBs of the one or more second RACH occasions; and wherein the one or more first RACH occasions are scheduled before the one or more second RACH occasions in a single uplink slot in the TDD configuration, wherein the single uplink slot immediately precedes a downlink slot in the TDD configuration.

2. The system of claim 1, wherein a downlink delay and an uplink delay through the distributed antenna system has a duration of approximately N symbols, wherein at least one of the one or more second RACH occasions is scheduled in the last N symbols of the single uplink slot in the TDD configuration.

3. The system of claim 1, wherein the at least one BBU entity is configured to configure only one first SSB and only one second SSB.

4. The system of claim 1, wherein the one or more first SSBs include at least two first SSBs; or wherein the one or more second SSBs include at least two second SSBs.

5. The system of claim 1, wherein the at least one BBU entity is configured to configure the one or more first SSBs and one or more second SSBs for the cell based on the RACH configuration, a downlink delay of the distributed antenna system, and an uplink delay of the distributed antenna system.

6. The system of claim 1, wherein the at least one BBU entity includes one or more central units communicatively coupled to one or more distributed units, wherein the one or more distributed units are communicatively coupled to the radio unit.

7. The system of claim 1, wherein the master unit is communicatively coupled to at least one second base station different than the first base station.

8. The system of claim 1, wherein the master unit is communicatively coupled to an antenna port of the radio unit.

9. A base station, comprising:

at least one baseband unit (BBU) entity; and a radio unit communicatively coupled to the at least one BBU entity, wherein the radio unit is located remotely from the at least one BBU entity, wherein the base station is configured to provide service to user equipment in a cell using a Time-Division Duplexing (TDD) configuration;

wherein the at least one BBU entity is configured to:

configure one or more first Synchronization Signal Blocks (SSBs) and one or more second SSBs for a cell;

map the one or more first SSBs to one or more first Random-Access Channel (RACH) occasions and the one or more second SSBs to one or more second RACH occasions; and transmit only the one or more first SSBs of the one or more first RACH occasions and not the one or more second SSBs of the one or more second RACH occasions; and wherein the one or more first RACH occasions are scheduled before the one or more second RACH occasions in a single uplink slot in the TDD configuration, wherein the single uplink slot immediately precedes a downlink slot in the TDD configuration.

10. The base station of claim 9, wherein a downlink delay and an uplink delay of distributed antenna system communicatively coupled to the base station has a duration of approximately N symbols, wherein at least one of the one or more second RACH occasions is scheduled in the last N symbols of the single uplink slot in the TDD configuration.

11. The base station of claim 9, wherein the at least one BBU entity is configured to configure only one first SSB and only one second SSB.

12. The base station of claim 9, wherein the one or more first SSBs include at least two first SSBs; or wherein the one or more second SSBs include at least two second SSBs.

13. The base station of claim 9, wherein the at least one BBU entity is configured to configure the one or more first SSBs and one or more second SSBs for the cell based on the RACH configuration, a downlink delay of a distributed antenna system, and an uplink delay of the distributed antenna system, wherein the distributed antenna system is communicatively coupled to the base station.

14. The base station of claim 9, wherein the at least one BBU entity includes one or more central units communicatively coupled to one or more distributed units, wherein the one or more distributed units are communicatively coupled to the radio unit.

15. A method for Random-Access Channel (RACH) occasion blocking by a base station, wherein the base station is configured to provide service to user equipment in a cell using a Time-Division Duplexing (TDD) configuration, the method comprising:

configuring one or more first Synchronization Signal Blocks (SSBs) and one or more second SSBs for a cell;

mapping the one or more first SSBs to one or more first RACH occasions and the one or more second SSBs to one or more second RACH occasions; and transmitting only the one or more first SSBs of the one or more first RACH occasions and not the one or more second SSBs of the one or more second RACH occasions; and wherein the one or more first RACH occasions are scheduled before the one or more second RACH occasions in a single uplink slot in the TDD configuration, wherein the single uplink slot immediately precedes a downlink slot in the TDD configuration.

16. The method of claim 15, wherein configuring the one or more first SSBs and one or more second SSBs for the cell is based on a RACH configuration, a downlink delay of a distributed antenna system, and an uplink delay of the distributed antenna system, wherein the distributed antenna system is communicatively coupled to the base station.

17. The method of claim 16, wherein the downlink delay of the distributed antenna system plus the uplink delay of the distributed antenna system has a duration of approximately N symbols, wherein at least one of the one or more second RACH occasions is scheduled in the last N symbols of the uplink slot in the TDD configuration.

* * * * *